US006576716B1

(12) United States Patent
Wo

(10) Patent No.: US 6,576,716 B1
(45) Date of Patent: Jun. 10, 2003

(54) PROCESS FOR MAKING SULFONATED POLYESTER COMPOUNDS

(75) Inventor: Shiming Wo, Dacula, GA (US)

(73) Assignee: Rhodia, INC, Cranbury, NJ (US)

( * ) Notice: Subject to any disclaimer, the term of this patent is extended or adjusted under 35 U.S.C. 154(b) by 334 days.

(21) Appl. No.: 09/726,762

(22) Filed: Nov. 30, 2000

Related U.S. Application Data

(60) Provisional application No. 60/168,240, filed on Dec. 1, 1999.

(51) Int. Cl.[7] ............................ C08F 20/00; C08G 63/68
(52) U.S. Cl. ..................... 525/444; 528/275; 528/295; 528/298; 528/300; 528/301; 528/302; 528/307; 528/308; 528/308.6; 525/437; 252/8.62; 252/8.83; 252/8.84; 510/281; 510/299; 510/477
(58) Field of Search .................... 528/275, 295, 528/298, 300, 301, 302, 307, 308, 308.6; 525/437, 444; 252/8.62, 8.83, 8.84; 510/281, 299, 477

(56) References Cited

U.S. PATENT DOCUMENTS

| 3,557,039 A | 1/1971 | McIntyre et al. |
| 3,962,152 A | 6/1976 | Nicol et al. |
| 4,427,557 A | 1/1984 | Stockburger |
| 4,554,328 A | 11/1985 | Sinker et al. |
| 4,702,857 A | 10/1987 | Gosselink |
| 4,863,619 A | 9/1989 | Borcher, Sr. et al. |
| 4,925,577 A | 5/1990 | Borcher, Sr. et al. |
| 4,999,128 A | 3/1991 | Sonenstein |
| 5,041,230 A | 8/1991 | Borcher, Sr. et al. |
| 5,142,020 A | 8/1992 | Kud et al. |
| 5,599,782 A | 2/1997 | Pan et al. |
| 5,728,671 A | 3/1998 | Rohrbaugh et al. |
| 5,786,318 A | 7/1998 | Blokzijl et al. |
| 5,789,365 A | 8/1998 | Blokzijl et al. |
| 5,789,366 A | 8/1998 | Blokzijl et al. |
| 5,789,367 A | 8/1998 | Blokzijl et al. |
| 5,820,982 A | 10/1998 | Salsman |

FOREIGN PATENT DOCUMENTS

EP   0 548 705 A1   6/1993

*Primary Examiner*—Samuel A. Acquah
(74) *Attorney, Agent, or Firm*—Watov & Kipnes, P.C.

(57) ABSTRACT

A method of producing sulfonated polyester compounds suitable for use as a soil releasing agent and/or textile sizing agent in which a sulfonated acid or ester is reacted with a hydroxy-containing compound to form a sulfonated hydroxy terminated ester which then undergoes a transesterification reaction with a poly(ethylene) terephthalate based polyester followed by polycondensation to form the desired sulfonated polyester compound.

39 Claims, No Drawings

US 6,576,716 B1

PROCESS FOR MAKING SULFONATED POLYESTER COMPOUNDS

RELATED APPLICATION

This application claims for priority U.S. Provisional Patent Application Serial No. 60/168,240 filed on Dec 1, 1999.

FIELD OF THE INVENTION

The present invention is directed to a process of producing sulfonated polyester compounds suitable for use as a soil releasing agent and/or textile sizing agent in which a sulfonated acid or ester is reacted with a hydroxy-containing compound to form a sulfonated hydroxy terminated ester which then undergoes a transesterification reaction with a poly(ethylene) terephthate based polyester followed by polycondensation to form the desired sulfonated polyester compound. The present invention provides lower cost, reduced cycle times and improved yields over conventional processes for the production of sulfonated polyester compounds.

BACKGROUND OF THE INVENTION

Sulfonated polyester compounds are known for removing soil and stains from a variety of substrates including filaments, fibers, fabrics, films and the like. Low molecular weight sulfonated polyester compounds are typically employed as soil release agents in laundry detergents while higher molecular weight sulfonated polyester compounds have been used for textile sizing.

U.S. Pat. No. 3,962,152 discloses a detergent composition containing polymers as soil release agents which are obtained by reacting dimethyl terephthalate with polyethylene glycol.

U.S. Pat. Nos. 4,863,619; 4,925,577 and 5,041,230 generally disclose methods of improving the processability of soil release polymers.

U.S. Pat. No. 4,999,128 discloses copolymers of poly (ethylene terephthalate/ethylene isophthalate) and related copolymers which are produced by reacting the esters with polyethylene glycol.

U.S. Pat. No. 5,142,020 discloses soil release promoters and detergents which are obtained by the polymerization of monomers such as dicarboxylic acid/ester/anhydride, dihydric alcohols and polyethylene glycols.

Sulfonated polyester compounds have received increased attention as effective soil release agents. For example, U.S. Pat. No. 3,557,039 discloses a stable aqueous dispersion comprising water and a water insoluble crystallizable block or graph polymeric compound which contains linear polyethylene terephthalate segments having sufficient ethylene terephthalate units to confer crystallinity to the compound. These polymers are prepared by reacting monomers which include dimethyl sodium sulfoisophthalate.

U.S. Pat. No. 4,427,557 discloses sulfonated copolymers used for preparing anionic textile treating compositions in which the polymerizable monomers include dimethyl sulfoisophthalate.

U.S. Pat. No. 4,702,857 discloses sulfonated copolymers used as soil release agents in detergent formulations in which the copolymers are obtained by polymerizing monomers such as dimethyl terephthalate, dimethyl sulfoisophthalate, polyethylene glycol and polyethylene glycol monoether.

U.S. Pat. No. 5,599,782 also discloses sulfonated polyester compounds useful as soil release agents. Polymerizable monomers which are mentioned in the reference include m-sodiosulfobenzoic acid, dimethylsodiosulfoisophthalate, dimethyl terephthalate, terephthalic acid and ethylene glycol.

U.S. Pat. No. 5,728,671 discloses sulfonated polyester compounds useful as soil release agents having whitening properties.

U.S. Pat. No. 5,786,318 discloses polymerizing such monomers as sulfonated aromatic dicarboxylic acids to produce soil release polymers for detergent compositions. Other soil release polymers containing sulfonated polymers are disclosed in U.S. Pat. Nos. 5,789,365; 5,789,366; and 5,789,367.

The market for polyester compounds for use as soil releasing agents and/or textile sizing agents and particularly sulfonated polyester compounds for this purpose has increased significantly in recent years. However, increased demand has spurred efforts to improve production capability of the desired sulfonated polyester compounds.

Traditional methods of producing sulfonated polyester compounds for use as soil releasing agents and/or textile sizing agents are problematical for reasons which include expensive starting materials, lengthy process cycle (i.e. the time it takes from the initial reaction to the production of a finished product) and low yields of the desired product or relative low reactor throughput. By way of example, the production of a sulfonated polyester compound through a transesterification reaction of dimethyl terephthalic and dimethyl-5-sulfoisophthalate with excess ethylene glycol, followed by esterification with terephthalate acid and then polycondensation undergoes a typical cycle time of about 38.5 hours for processing a 15 ton batch of polyester. Since the reaction produces 35% of distillate, the long cycle time and low yield or reactor throughput makes it very difficult to meet the requirements of the growing market demand for such sulfonated polyester compounds.

SUMMARY OF THE INVENTION

The present invention is directed to a process for the production of sulfonated polyester compounds in which reaction yields and cycle time are significantly improved over conventional processes for the production of the same or similar compounds. The present method is generally directed to the production of a sulfonated polyester compound suitable for use as a soil releasing agent and/or textile sizing agent in which a sulfonated acid or corresponding alkyl ester is reacted with a hydroxy-containing compound to produce a sulfonated ester intermediate compound which is then reacted with a polyester compound selected to afford the final polyester compound with a desired molecular weight.

In a particular aspect of the present invention, there is provided a method of producing a sulfonated polyester compound suitable for use as a soil releasing agent and/or textile sizing agent comprising:

a) reacting at least one compound of Formula (I)

$$XSO_3\text{—}R\text{—}(COOY)_n \qquad (I)$$

wherein
X is a cation,
R is an aryl group,
Y is selected from the group consisting of hydrogen and an alkyl group, and n is a positive integer with at least one compound of Formula (II)

$R_1$—(OH)m       (II)

wherein $R_1$ is selected from the group consisting of an alkyl group, a cycloalkyl group and an aryl group, which may be substituted with an alkyl group or an aryl group, and m is a positive integer and optionally with a compound of Formula (III)

$R_2$—(COOZ)p       (III)

wherein $R_2$ is selected from the group consisting of an alkyl group and an aryl group, Z is selected from the group consisting of hydrogen and an alkyl group, and p is a positive integer, and optionally with a compound of Formula (IV)

wherein $R_3$ and $R_4$ are each independently selected from the group consisting of hydrogen and an alkyl group, and q is a positive integer to produce at least one ester compound intermediate, and reacting the resulting ester compound intermediate with a homo—or co-poly(ethylene terephthalate) to produce the sulfonated polyester.

DETAILED DESCRIPTION OF THE INVENTION

The method of producing a sulfonated polyester compound in accordance with the present invention for use as a soil releasing agent and/or textile sizing agent begins with the reaction of at least one compound of Formula (I)

$XSO_3$—R—(COOY)n       (I)

wherein X is a cation, R is an aryl group which may be substituted with an alkyl group or an aryl group, Y is selected from the group consisting of hydrogen and an alkyl group and n is a positive integer. The cations available for X include, for example, sodium, lithium, potassium, $NH_4$ and tetrabutylphosphonium. Sodium is the preferred cation for the compound of Formula (I). R is an aryl group and includes, for example, phenyl, and naphthyl.

The starting sulfonated compound may be in the form of an acid wherein Y is hydrogen or in the form of an alkyl ester. Preferred alkyl groups are methyl, ethyl, propyl and butyl with methyl being the preferred alkyl group. The number of acid or ester groups is from 1 to 4, preferably 1 or 2. The most preferred number of acid or ester groups is 2.

Examples of suitable compounds of Formula (I) include dimethyl-5-sodiosulfoterephthalate, 5-sodiosulfoterephthalic acid, 5-lithoisophthalic acid, 3-sodiosulfobenzoic acid, and 4-sodiosulfodiphenyl-4,4'-dicarboxylic acid. The preferred compounds of Formula (I) are sodiosulfoisophthalic acid and 3-sodiosulfobenzoic acid.

The compound of Formula (I) is reacted with a hydroxy-containing compound of Formula (II) $R_1$—(OH)m. The hydroxy-containing compound can be selected from monols, diols and polyols. $R_1$ is selected from the group consisting of unsubstituted alkyl, cycloalkyl, and aryl groups which may be substituted with an alkyl group and an aryl group.

Preferred alkyl groups are those having 1–8 carbon atoms most preferably methyl, ethyl, propyl, and butyl. Preferred cycloalkyl groups are those having 5 to 8 carbon atoms such as cyclohexanyl. Preferred aryl groups for $R_1$ include phenyl and naphthyl. M is preferably in the range of from 1 to 4, most preferably 2. Preferred compounds of Formula (II) include ethylene glycol, 1,2- propylene glycol, 1,3-propanediol, neopentyl glycol, glycerol, 1,2 butylene glycol, 1,4-butanediol, 2,2-dimethyl-1,3-propanediol, 1,6-hexanediol and 1,4-cyclohexanedimethanol.

In addition to compounds of Formulas (I) and (II), the reaction can also be also conducted in the presence of a compound of Formula (III).

$R_2$—(COOZ)p       (III)

depending on the application of the final polymer. $R_2$ is selected from the group consisting of an alkyl group and an aryl group, which may be substituted with an alkyl group or an aryl group. Z is selected from the group consisting of hydrogen and an alkyl group and p is a positive integer. Preferred alkyl groups are those having 1–12 carbon atoms. Preferred alkyl groups for Z are those having 1–4 carbon atoms. Preferred values for P are 1 and 2. Exemplary compounds where $R_2$ is an alkyl group include adipic, succinic, sebacic, azelaic, glutaric and suberic acids and their corresponding alkyl esters. Exemplary compounds where $R_2$ is an aryl group include terephthalic, isophthalic, orthophthalic, 1,2-naphthalene dicarboxylic, 1,4-naphthalenedicarboxylic, 1,5-naphthalenedicarboxylic, 1,6-naphthalenedicarboxylic, 1,7-naphthalenedecarboxylic, 1,8-naphthalenedicarboxylic, 2,3-naphthalenedicarboxylic, 2,6-naphthalenedicarboxylic, 2,7-naphthalenedicarboxylic acids and their corresponding alkyl esters.

A compound of Formula (IV) may also be used as an optional starting material

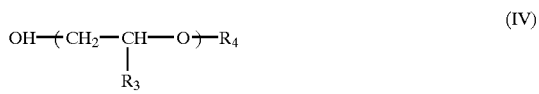

wherein $R_3$ and $R_4$ are each independently selected from the group consisting of hydrogen and an alkyl group and q is a positive integer.

Preferred alkyl groups for $R_3$ are those having 1–4 carbon atoms. Preferred alkyl groups for $R_4$ are those having 1–12 carbon atoms especially methyl and lauryl. Preferred values for q are 2–20. Exemplary compounds of the optional material of Formula (IV) include polyethylene glycol, polypropylene glycol and block copolymers of polyethylene glycol and polypropylene glycol and their corresponding alkyl monoethers. The compounds of Formula (IV) preferably have a molecular weight of no more than about 1,000.

The reaction of the compounds of Formulas (I) and (II) optionally in the presence of at least one compound of Formulas (III) and (IV) is typically conducted at a temperature of from about 120 to 280° C., preferably from about 130 to 190° C. The reaction is typically carried out in the presence of a catalyst capable of catalyzing esterification and/or transesterification reactions, such as, for example titanium (IV) (triethanolaminato) isopropoxide, titanium (IV) propoxide, titanium (IV) butoxide, manganese acetate, antimony trioxide, hydrated monobutyltin oxide and magnesium oxide. Other suitable catalysts would be well known to these skilled in the art. The preferred catalyst is titanium (IV) (triethanolaminato) isopropoxide.

The reaction of the compounds of Formulas (I) and (II) and optionally at least one compound of Formulas (III) and (IV) produces at least one ester compound intermediate. The ester compound intermediate is then reacted continuously or intermittently with a homo—or co-poly(ethylene terephthalate) to produce the desired sulfonated polyester compound. This reaction is typically conducted at a temperature of from about 150 to 280° C., preferably form about 180 to 260° C. Depending on the desired molecular weight, a vacuum of from about 600 to 0.5 mmHg can be applied after all of the poly(ethylene terephthalate) has melted.

The preferred poly(ethylene terephthalate) compounds for reacting with the ester compound intermediate is a copolymer of polyethylene terephthalate and comonomers selected from the group consisting of isophthalate, diethylene glycol, propylene glycol, and 1,4-cyclohexanedimethanol. The resulting reaction produces a sulfonated polyester compound wherein the position and number of sulfonated groups are determined by the suitable selection of the starting materials. By selecting a compound of Formula (I) wherein n is 1, at least some of the sulfonated groups will appear as an end group in the polyester chain. By employing at least one compound of Formula (I) wherein n is greater than 1, at least some of the sulfonated groups will appear intermittently in the polyester compound and not as an end group.

The following examples are illustrative of the embodiments of the invention and are not intended to limit the invention as encompassed by the claims forming part of the application.

EXAMPLES

Example 1

To a 1 liter resin reactor equipped with a mechanical stirrer, a packed refluxing column, a nitrogen inlet, and a heat source was added 350 g of ethylene glycol, 200 g of 5-sodiosulfoisophthalic acid, 20 g of isophthalic acid and 1.2 g of titanium (IV) (triethanolaminato) isopropoxide. The mixture was heated to 230° C. and held at that temperature for 30 minutes. 380 g of poly(ethylene terephthalate) was added and the mixture was heated to 230° C. Another 440 g of poly(ethylene terephthalate) was added and the mixture was heated to 260° C. When the batch temperature had reached 260° C., a vacuum was applied to 200 mmHg and the polymer was held for 20 minutes and then cooled to 160° C. for discharge. The resulting polymer exhibited excellent soil releasing properties.

Example 2

The procedure and materials as set forth in Example 1 were repeated except that a mixture of 250 g of diethylene glycol and 50 g of ethylene glycol was used as a starting material in place of 350 g of ethylene glycol. The resulting polymer exhibited excellent soil releasing properties.

Example 3

The procedure and materials as set forth in Example 1 were repeated except that 5-lithosulfoisophthalic acid was used to replace 5-sodiosulfoisophthalic acid. The resulting polymer exhibited excellent soil releasing properties.

Example 4

The procedure and materials as set forth in Example 1 were repeated except that the starting materials were heated to 185° C. and held for 30 minutes before the polyethylene terephthalate was added.

Example 5

A mixture of 201 g of 5-sodiosulfoisophthalic acid, 300 g ethylene glycol and 150 g of polyethylene glycol having a molecular weight of 200 was heated to 185° C. and held for 30 minutes. 380 g of a copolymer of poly(ethylene terephthalate—ethylene isophthalate) in a 60:40 weight ratio was added to the mixture and the resulting mixture was heated to 235° C. Thereafter 440 g of the same copolymer was added to the mixture and heated to 250° C. under atmospheric pressure for two hours followed by cooling to 160° C. for discharging. The resulting polymer exhibited excellent soil releasing properties.

Example 6

A mixture of 140 g of propylene glycol, 350 g of ethylene glycol, 175 g of 3-sodiosulfobenzoic acid and 210 g of 5-sodioisophthalic acid was heated to 230° C. and held for 30 minutes. 380 g of poly(ethylene terephthalate) was added to the mixture which was then heated to 230° C. Thereafter 440 g of the same copolymer was added to the mixture and heated to 250° C. under atmospheric pressure for two hours followed by cooling to 160° C. for discharging. The resulting polymer exhibited excellent soil releasing properties.

Example 7

A mixture of 140 g of propylene glycol, 350 g of ethylene glycol, 175 g of 3-sodiosulfobenzoic acid and 210 g of 5-sodioisophthalic acid was heated to 230° C. and held for 30 minutes. 380 g of poly(ethylene terephthalate) was added to the mixture which was then heated to 230° C. Thereafter an additional 440 g of poly(ethylene terephthalate) was added and the mixture heated to 250° C. When the temperature reached 250° C., a vacuum was applied and the batch was held at 5 mmHg for five hours before discharge. The resulting polymer exhibited excellent textile sizing properties.

Example 8

450 g of ethylene glycol, 160 g of isophthalic acid, 171 g of 5-sodiosulfoisophthalic acid, 0.08 g of antimony trioxide and 0.6 of titanium propoxide were combined and heated to 230° C. and held for 30 minutes. 360 g of poly(ethylene terephthalate) was added to the mixture which was heated to 240° C. Thereafter an additional 380 g of poly(ethylene terephthalate) was added to the mixture followed by heating to 250° C. When the temperature reached 250° C. a vacuum was applied and the batch was held at 5 mmHg for five hours before discharge. The resulting polymer exhibited excellent textile sizing properties.

Example 9

400 g of ethylene glycol, 171 g of sodiosulfoisophthalic acid, 0.08 g of antimony trioxide and 0.6 g titanium(IV) (triethanolaminato)isopropxide was heated to 185° C. and held for 30 minutes. 400 g of a poly(ethylene terephthalate) containing 20 molar % of ethylene isophthalate was added and the batch was heated to 240° C. Thereafter, an additional 510 g of the same poly(ethylene terephthalate) was added to the mixture followed by heating to 250° C. When the temperature reached 250° C.m a 5 mmHg vacuum was applied for three hours followed by discharge of the polymer. The resulting polymer exhibited excellent textile sizing properties.

What is claimed is:

1. A method of producing a sulfonated polyester compound suitable for use as a soil releasing agent or a textile sizing agent comprising:

a) reacting at least one compound of Formula (I)

$$XSO_3-R-(COOY)_n \quad (I)$$

wherein X is a cation,
R is an aryl group which may be substituted with an alkyl group or an aryl group,
Y is selected from the group consisting of hydrogen and an alkyl group, and
n is a positive integer
with at least one compound of Formula (II)

$$R_1-(OH)_m \quad (II)$$

wherein $R_1$ is selected from the group consisting of an alkyl group, a cycloalkyl group and an aryl group which groups may be substituted with an alkyl group or an aryl group, and m is a positive integer to produce at least one ester compound intermediate,
b) reacting the ester compound intermediate with a homo- or co-poly(ethylene terephthalate) to produce a reaction mixture containing the sulfonated polyester compound, and
c) isolating the sulfonated polyester compound from the reaction mixture produced in step (b).

2. The method of claim 1 wherein X is selected from the group consisting of sodium, lithium, potassium, $NH_4$ and tetrabutylphosphonium.

3. The method of claim 2 wherein X is sodium.

4. The method of claim 1 wherein R is phenyl or naphthyl.

5. The method of claim 1 wherein Y is an alkyl group selected from the group consisting of methyl, ethyl, propyl, and butyl.

6. The method of claim 5 wherein Y is methyl.

7. The method of claim 1 wherein Y is hydrogen.

8. The method of claim 1 wherein n is 1–4.

9. The method of claim 8 wherein n is 1 or 2.

10. The method of claim 9 wherein n is 2.

11. The method of claim 1 wherein the compound of Formula (I) is selected from the group consisting of dimethyl-5-sodiosulfoterephthalate, 5-sodiosulfoisophthalic acid, 5-lithoisophthalic acid, 3-sodiosulfobenzoic acid, 4-sodiosulfo-2,2-naphthalenedicarboxylic acid, and 4-sodiosulfddiphenyl-4,4'-dicarboxylic acid.

12. The method of claim 1 wherein $R_1$ is an alkyl group having 1–8 carbon atoms.

13. The method of claim 12 wherein $R_1$ is an alkyl group selected from the group consisting of methyl, ethyl, propyl, and butyl.

14. The method of claim 1 wherein $R_1$ is phenyl or naphthyl.

15. The method of claim 1 wherein $R_1$ is a cycloalkyl group having 5 to 8 carbon atoms.

16. The method of claim 1 wherein m is from 1 to 4.

17. The method of claim 13 wherein m is 2.

18. The method of claim 1 wherein the compound of Formula (II) is selected from the group consisting of ethylene glycol, 1,2-propylene glycol, 1,3-propanediol, neopentyl glycol, glycerol, 1,2 butylene glycol, 1,4-butanediol, 2,2-dimethyl-1,3-propanediol, 1,6-hexanediol and 1,4-cyclohexanedimethanol.

19. The method of claim 1 comprising conducting the reaction of step (a) at a temperature of from about 120 to 280° C.

20. The method of claim 1 wherein the reaction of step (a) is conducted at a temperature of from about 130 to 190° C.

21. The method of claim 19 further comprising conducting the reaction of step (a) in the presence of an esterifcation or transesterification catalyst.

22. The method of claim 1 comprising conducting the reaction of step (b) at a temperature of from about 150 to 280° C.

23. The method of claim 22 wherein the reaction of step (b) is conducted at a temperature of from about 180 to 260° C.

24. The method of claim 22 further comprising conducting the reaction in a vacuum of from about 600 to 0.5 mmHg.

25. The method of claim 1 wherein the co-poly(ethylene terephthalate) is a co-polymer of poly(ethylene terephthalate) with a comonomer selected from the group consisting of isophthalate, diethylene glycol, propylene glycol, and 1,4-cyclohexanedimethanol.

26. The method of claim 1 wherein step (a) further comprises reacting the compounds of Formulas (I) and (II) in the presence of at least one compound of Formula (III)

$$R_2-(COOZ)_p \quad (III)$$

wherein $R_2$ is selected from the group consisting of an alkyl group and an aryl group which may be substituted with an alkyl group or an aryl group, Z is selected from the group consisting of hydrogen and an alkyl group and p is a positive integer.

27. The method of claim 26 wherein $R_2$ is an alkyl group having 1–12 carbon atoms.

28. The method of claim 26 wherein Z is an alkyl group having 1–4 carbon atoms.

29. The method of claim 26 wherein $R_2$ is phenyl or naphthyl.

30. The method of claim 26 wherein p is 1 or 2.

31. The method of claim 26 wherein the compound of Formula (III) is selected from the group consisting of terephthalic, isophthalic, orthophthalic, 1,2-naphthalene dicarboxylic, 1,4-naphthalenedicarboxylic, 1,5-naphthalenedicarboxylic, 1,6-naphthalenedicarboxylic, 1,7-naphthalenedecarboxylic, 1,8-naphthalenedicarboxylic, 2,3-naphthalenedicarboxylic, 2,6-naphthalenedicarboxylic, 2,7-naphthalenedicarboxylic acids and their corresponding alkyl esters.

32. The method of claim 1 wherein step (a) further comprises reacting the compounds of Formula (I) and (II) in the presence of at least one compound of Formula (IV)

$$OH-(CH_2-CH-O)_q-R_4 \quad (IV)$$
$$\qquad\qquad\quad |$$
$$\qquad\qquad\ R_3$$

wherein $R_3$ and $R_4$ are each independently selected from the group consisting of hydrogen and an alkyl group and q is a positive integer.

33. The method of claim 32 wherein $R_3$ is an alkyl group having 1–4 carbon atoms.

34. The method of claim 32 wherein $R_4$ is an alkyl group having 1–12 carbon atoms.

35. The method of claim 34 wherein $R_4$ is methyl or lauryl.

36. The method of claim 32 wherein q is 2 to 20.

37. The method of claim 32 wherein the compound of Formula IV is selected from the group consisting of polyethylene glycol, polypropylene glycol, block copolymers of polyethylene glycol and polypropylene glycol and alkyl monoethers thereof.

38. The method of claim 1 comprising intermittently adding the homo- or co-poly(ethylene terephthalate) to the ester compound intermediate.

39. The method of claim 1 comprising continuously adding the homo- or co-poly(ethylene terephthalate) to the ester compound intermediate.

* * * * *

UNITED STATES PATENT AND TRADEMARK OFFICE
CERTIFICATE OF CORRECTION

PATENT NO. : 6,576,716 B1  Page 1 of 1
DATED : June 10, 2003
INVENTOR(S) : Shiming Wo It is certified that error appears in the above-identified patent and that said Letters Patent is hereby corrected as shown below:

Column 7,
Line 40, the compound "4-sodiosulfddiphenyl-4" should be
-- "4-sodiosulfodiphenyl-4" --.

Signed and Sealed this

Sixteenth Day of September, 2003

JAMES E. ROGAN
*Director of the United States Patent and Trademark Office*